UNITED STATES PATENT OFFICE.

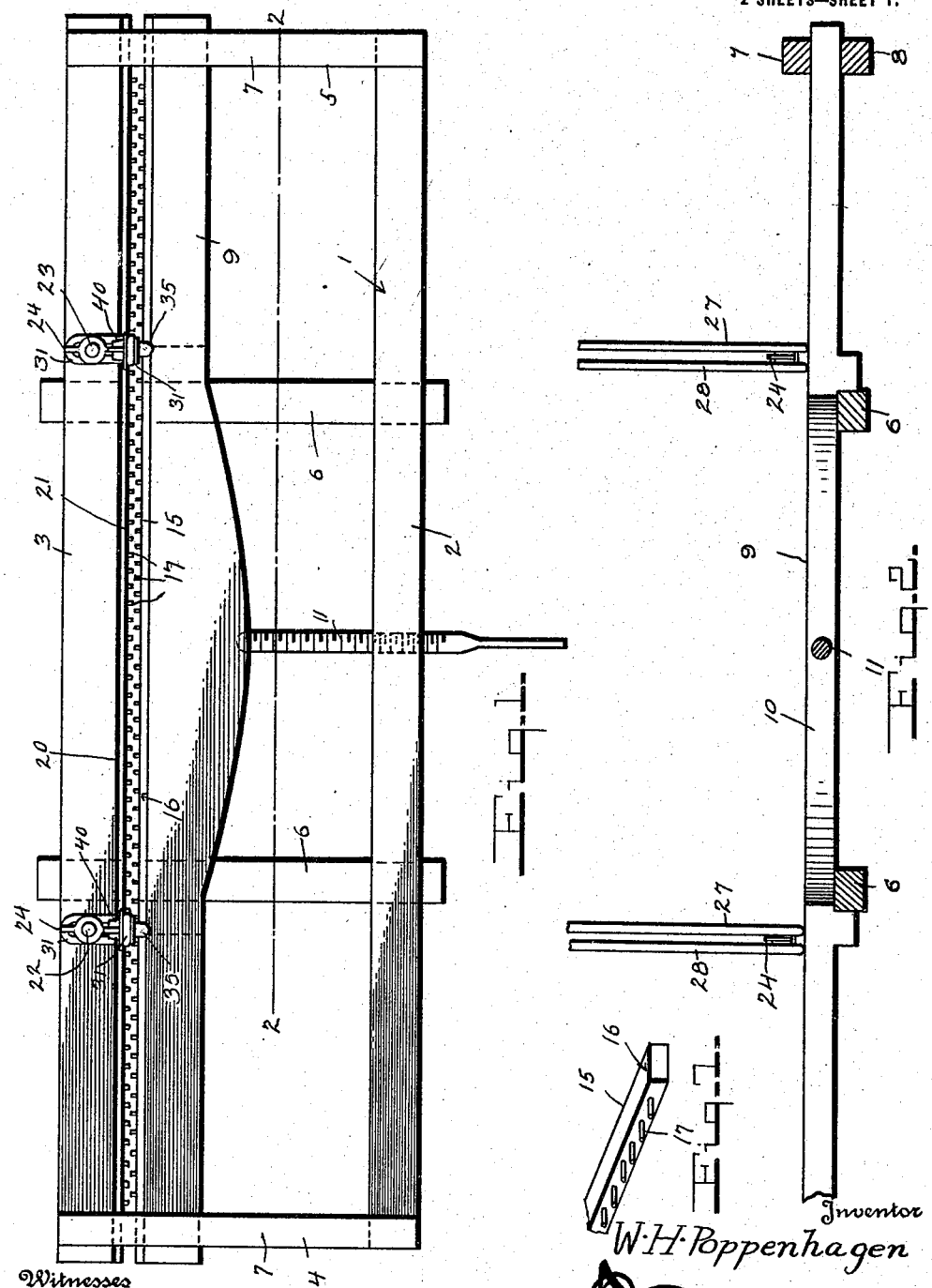

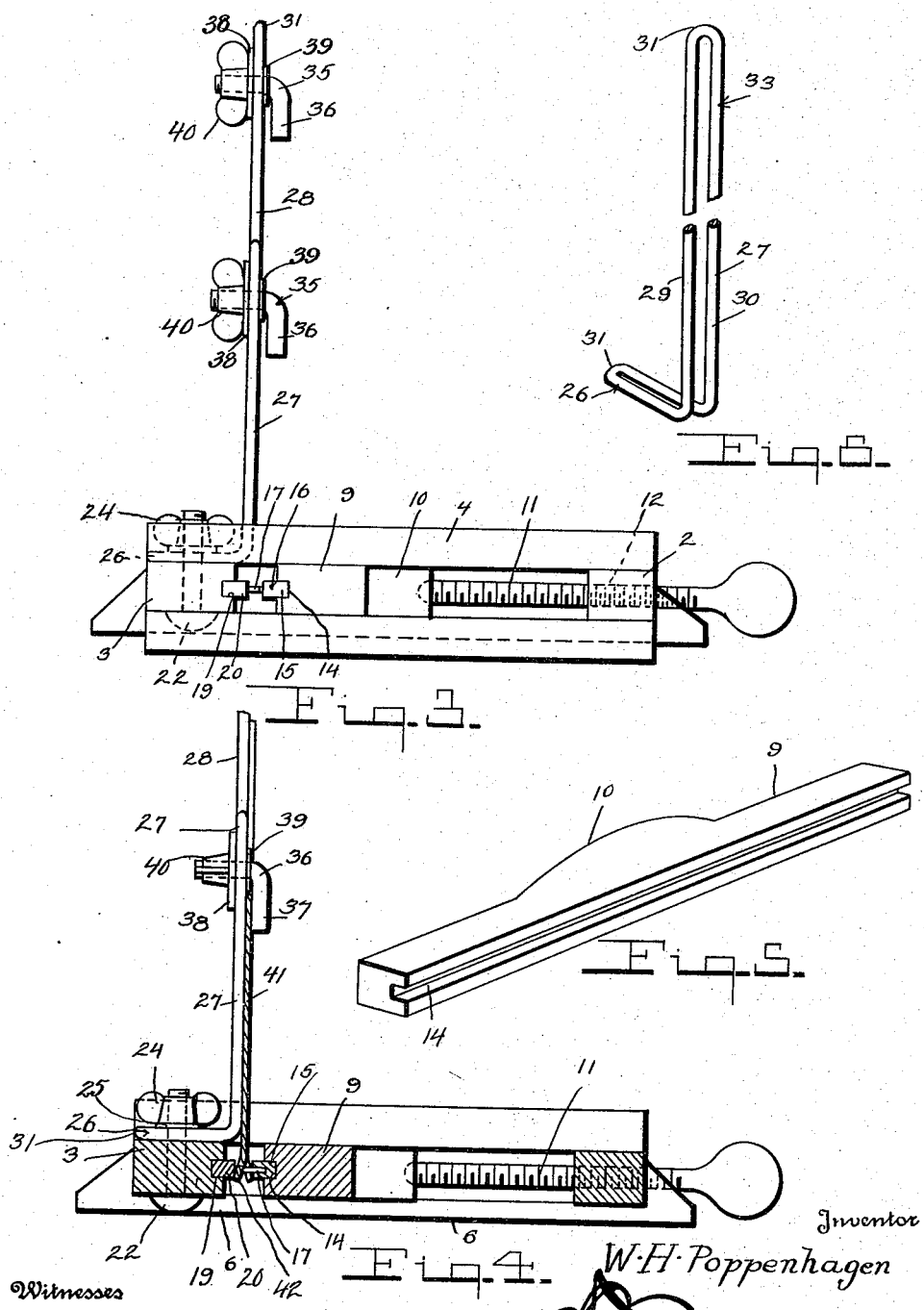

WILLIAM H. POPPENHAGEN, OF SUMNER TOWNSHIP, KANKAKEE COUNTY, ILLINOIS.

SAW-SET.

1,217,822.   Specification of Letters Patent.   Patented Feb. 27, 1917.

Application filed January 18, 1916. Serial No. 72,745.

*To all whom it may concern:*

Be it known that I, WILLIAM H. POPPENHAGEN, a citizen of the United States, residing at Sumner township, in the county of Kankakee and State of Illinois, have invented certain new and useful Improvements in Saw-Sets; and I do hereby declare the following to be a full, clear, and exact description of the invention, such as will enable others skilled in the art to which it appertains to make and use the same.

This invention relates to saw sets, and the primary object of the invention is to provide a saw set which will set all of the teeth on a saw blade, by a single operation.

Another object of this invention is to provide a saw set as specified which includes a supporting frame having a rigid setting bar carrying plate attached thereto and a movable setting bar carrying plate adjustably carried thereby for movement toward each other, and to detachably connect the setting bars to said plate for setting the teeth in the saw upon movement of the movable plate into a saw tooth setting position.

A further object of this invention is to provide a saw set as specified which has a novel form of support for supporting the back of a saw blade during the setting of the teeth.

With the foregoing and other objects in view this invention consists in such novel features of construction, combination and arrangement of parts as will be hereinafter more fully described, illustrated in the accompanying drawings, and claimed.

In describing the invention in detail reference will be had to the accompanying drawings wherein like characters designate like and corresponding parts throughout the several views, and in which:—

Figure 1 is a plan view of the improved saw set,

Fig. 2 is a sectional view on the line 2—2 of Fig. 1,

Fig. 3 is an end view of the improved saw set,

Fig. 4 is a cross sectional view through the set showing a saw attached thereto, Fig. 5 is a detail perspective view of the movable setting bar carrying plate, Fig. 6 is a detail perspective view of a part of the adjustable structure for supporting the saw back, and Fig. 7 is a fragmentary perspective view of one of the setting bars.

Referring more particularly to the drawings, 1 designates the supporting frame of the saw set, as an entirety, which comprises longitudinal side rails 2 and 3, end rails 4 and 5, and a plurality of cross braces 6. The end rails 4 and 5, comprise a pair of bars 7 and 8, which are spaced from each other upon opposite sides of the ends of the side rails 2 and 3, providing a guiding space at each end of the frame for guiding the slidable movement of the setting bar carrying plate 9 which is slidably supported by the frame structure 1. The slidable setting bar carrying plate 9 rides upon the upper surfaces of the cross bar braces 6 and it has an outwardly bulged portion 10 extending outwardly from its outer edge, to which a feed screw 11 is connected. The feed screw 11 extends through a screw threaded opening 12 formed in the side rail 2, so that upon rotary movement of the feed screw, the plate 9 will be moved toward or away from the inner edge of the rail 3, depending upon the direction of rotation of the feed screw.

The plate 8 is provided with a longitudinally extending recess 14 formed in its inner edge, in which is removably seated the back 15 of the saw tooth setting bar 16. The back bar 15 has a plurality of saw tooth setting teeth 17. The side rail 3 is provided with a longitudinally extending recess 19 formed in its inner edge, in which the back of a saw tooth setting bar 20 is seated. The bar 20 has teeth 21 formed upon its outer edge which are disposed staggeredly to the teeth 17, for engaging the teeth of a saw next to ones which are engaged by the teeth 17, for properly setting the saw teeth, as is shown in Fig. 4 of the drawings.

Bolts 22 and 23 extend through the side rail 3 and they have their upper ends projecting above the upper edge of the side rail, and screw threaded. Wing nuts 24 are mounted upon the upper screw threaded ends of the bolts 22 and 23 and they engage washers 25 which are mounted upon the nuts and engage the horizontal portion 26 of upstanding saw blade supporting brackets 27 and 28. Each of the brackets 27 and 28 is composed of spaced rods 29 and 30, the ends of which are connected as is shown at 31. The brackets 27 and 28 are substantially L-shaped, comprising horizontal base portions 26 and vertical supporting portions 33.

The vertical portion of the bracket 28 is considerably higher than the vertical portion of the bracket 27, to accommodate the wide portion of a saw blade. Saw clamps 35 are adjustably carried by each of the brackets, and they comprise angled bolts 36, which have their portions 37 extending parallel to the vertical portion 33 of the bracket, and spaced slightly therefrom for clamping a saw between the vertical portion 33 of the bracket and the vertically extending portion 37 of the angled bolts 36. The bolts 36 extend through the spaces between the rods 29 and 30 of the brackets, and have washers 38 and 39 mounted thereon which engage the opposite sides of the brackets. Wing nuts 40 are mounted upon the angled bolts 36 for clamping the vertical portions 37 in firm binding engagement with a saw blade as indicated at 41, and also clamping the saw blade against the vertical portions 33 of the brackets 27 and 28, for holding the saw rigidly in position during the setting of the teeth of the same.

When it is desired to set the teeth of a saw as indicated at 41, by the improved set, the feed screw 11 is rotated for moving the bar or plate 9 away from the rail 3, and the saw, as indicated at 41, is positioned with the teeth downwardly, and clamped in place by the adjustment of the wing nut 40, so that the teeth 42 of the saw will be positioned in proper relation to the setting teeth 17 and 21 of the setting bars 16 and 20. After the saw 41 has been properly positioned, the feed screw 11 is rotated for forcing the plate 9 toward the rail 3, which will cause the teeth 17 to engage certain of the saw teeth 42 and properly set them. The teeth which are disposed staggeredly to the teeth engaging the setting teeth 17 will be engaged by the setting teeth 21, as is indicated in Fig. 4 of the drawings, which will properly set all of the teeth of the saw in one operation.

From the foregoing description taken in connection with the accompanying drawings the advantages of construction and of the method of operation of the improved saw sets will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a saw set structure, a supporting frame, a pair of substantially L-shaped brackets detachably connected to said supporting frame, the vertical portions of said brackets being composed of a pair of spaced rods, angle bolts extending between said rods, said bolts having vertical portions parallel with said rods, and means for holding said angle bolts in various adjusted positions along the length of said vertical portions.

2. In a saw set structure, a supporting frame, a pair of substantially L-shaped brackets detachably connected to said supporting frame, the vertical portions of said brackets being composed of a pair of spaced rods, angle bolts extending between said rods, said bolts having vertical portions parallel with said rods, and means for holding said angle bolts in various adjusted positions along the length of said vertical portions, said L-shaped brackets being adjustably connected to said supporting frame for horizontal adjustment, and means for holding said bracket in various adjusted positions.

3. In a saw set structure, a supporting frame, a saw tooth setting bar rigidly carried by said frame, a second saw tooth setting bar movably carried by said frame for movement toward or from said first named setting bar, a plurality of setting teeth carried by each of said setting bars, the setting teeth of one of said bars being disposed staggeredly with respect to the setting teeth of the other bar, said teeth extending throughout the entire length of the bars for setting all of the teeth of the saw in one operation, brackets carried by said frame for supporting a saw blade, clamps adjustably carried by said brackets for vertical adjustment with respect to said setting teeth for clamping saw blades of different widths in engagement with the brackets and in proper relation to said setting teeth, and means for holding said brackets in adjusted positions with respect to said setting teeth.

In testimony whereof I affix my signature in presence of two witnesses.

WILLIAM H. POPPENHAGEN.

Witnesses:
 JOHN ROSS,
 CARL POPPENHAGEN.